US006917921B1

(12) United States Patent
Cimral et al.

(10) Patent No.: US 6,917,921 B1
(45) Date of Patent: Jul. 12, 2005

(54) METHOD AND APPARATUS FOR DISTRIBUTING IT MANAGEMENT PRACTICE INFORMATION

(75) Inventors: John Cimral, West Linn, OR (US); Prashant Dubey, Portland, OR (US); Mark S. Lawler, Portland, OR (US); Amir Ofer, Jerusalem (IL); Doug Yokoyama, San Francisco, CA (US)

(73) Assignee: Prosight, Ltd., Jerusalem (IL)

( * ) Notice: Subject to any disclaimer, the term of this patent is extended or adjusted under 35 U.S.C. 154(b) by 709 days.

(21) Appl. No.: 09/584,015

(22) Filed: May 30, 2000

Related U.S. Application Data (63) Continuation-in-part of application No. 09/560,670, filed on Apr. 27, 2000, now Pat. No. 6,578,004.

(51) Int. Cl.[7] .............................................. G06F 17/60
(52) U.S. Cl. .................... 705/7; 705/8; 705/9; 705/10; 705/11; 707/101; 707/105; 345/705; 345/713; 709/9; 709/204
(58) Field of Search ......................... 705/7–11; 707/9; 345/705, 713; 709/204; 717/101, 105

(56) References Cited

U.S. PATENT DOCUMENTS

| | | | | |
|---|---|---|---|---|
| 5,446,895 A | * | 8/1995 | White et al. ................. | 717/101 |
| 5,548,506 A | * | 8/1996 | Srinivasan ...................... | 705/8 |
| 5,724,508 A | * | 3/1998 | Harple et al. ............... | 709/205 |
| 5,781,909 A | * | 7/1998 | Logan et al. ................ | 707/200 |
| 5,800,181 A | * | 9/1998 | Heinlein et al. ............. | 434/322 |
| 5,948,054 A | * | 9/1999 | Nielsen ....................... | 709/200 |
| 6,223,177 B1 | * | 4/2001 | Tatham et al. .................. | 707/9 |
| 6,330,598 B1 | * | 12/2001 | Beckwith et al. ............ | 709/223 |
| 6,368,110 B1 | * | 4/2002 | Koenecke et al. ........... | 434/219 |
| 6,438,580 B1 | * | 8/2002 | Mears et al. ................. | 709/204 |

FOREIGN PATENT DOCUMENTS

WO     WO 94/20918    *   1/1995

OTHER PUBLICATIONS

Davenport et al. Successful Knowledge Management Projects, Sloan Management Review, 0019848X, Winter98, vol. 39, Issue 2 Database: Business Source Corporate.*

* cited by examiner

*Primary Examiner*—Jagdish N Patel
(74) *Attorney, Agent, or Firm*—Stoel Rives LLP (57) ABSTRACT

An information technology (IT) management practice knowledge portal provisions first information pages associated with IT management practices for retrieval. One or more IT management practice knowledge associates provision second information pages associated with IT management practices, and associate the second information pages with the first information pages to facilitate retrieval of the second information pages. Further, management features of an IT management application are associated with the first information pages to enable users of the management features to determine corrective actions to identified problems using IT management practice information provided by selected ones of the first as well as the second information pages.

3 Claims, 7 Drawing Sheets

IT Management Practice Knowledge Portal

Linking Associate's Information to Key Performance Issues   1502

Associate:

| Associate Name 1504 |

Associate Icon:

| Filename of Graphical Identification 1506 |

Key Performance Issue:

| Identification of Key Performance Issue 1508 |

Associate's Info Page

| URL to the Associate's Information Page 1510 |

Others ...

METHOD AND APPARATUS FOR DISTRIBUTING IT MANAGEMENT PRACTICE INFORMATION

RELATED APPLICATION

This application is a continuation-in-part application of U.S. patent application Ser. No. 09/560,670, entitled "Method and Apparatus for Facilitating Management of Information Technology Investments," filed on Apr. 27, 2000, now U.S. Pat. No. 6,578,004, issued Jun. 10, 2003, which are hereby incorporated by reference in their entirety.

BACKGROUND OF THE INVENTION

1. Field of the Invention

The present invention relates to the field of information management. More specifically, the present invention relates to the distribution of information associated with Information Technology (IT) management practices.

2. Background Information

The following paragraphs describe methods and apparatuses for facilitating management of IT investments, including the employment of "investment maps", "scorecards", and "dashboards" to enable IT managers and professionals to better manage the increasingly large IT investments being made by their organizations. The disclosed methods and apparatuses enable IT managers and professionals to monitor and track the various IT investments, and access and analyze selected key performance indicators or issues by portfolios and/or projects. Examples of these key performance indicators or issues include, but are not limited to, staffing, expense, function definition, code size, code quality indicators/issues, and the like. While the methods and apparatuses enable IT managers and professionals to spot problems or potential problems quickly, it is further desired that information and knowledge on the best IT management practices can be made available to the IT managers and professionals on an as-needed, on-demanded basis, thereby enabling these IT managers and professionals to make intelligent adjustments and/or corrective actions to effectively address the identified problem areas.

SUMMARY OF THE INVENTION

An information technology (IT) management practice knowledge portal provisions first information pages associated with IT management practices for retrieval. One or more IT management practice knowledge associates provision second information pages associated with IT management practices, and associate the second information pages with the first information pages to facilitate retrieval of the second information pages. Further, management features of an IT management application are associated with the first information pages to enable users of the management features to determine corrective actions to identified problems using IT management practice information provided by selected ones of the first as well as the second information pages.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, information pages, URLs, links, request, retrieval, and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system. Further, the term "computer system" includes general purpose, as well as special purpose, data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
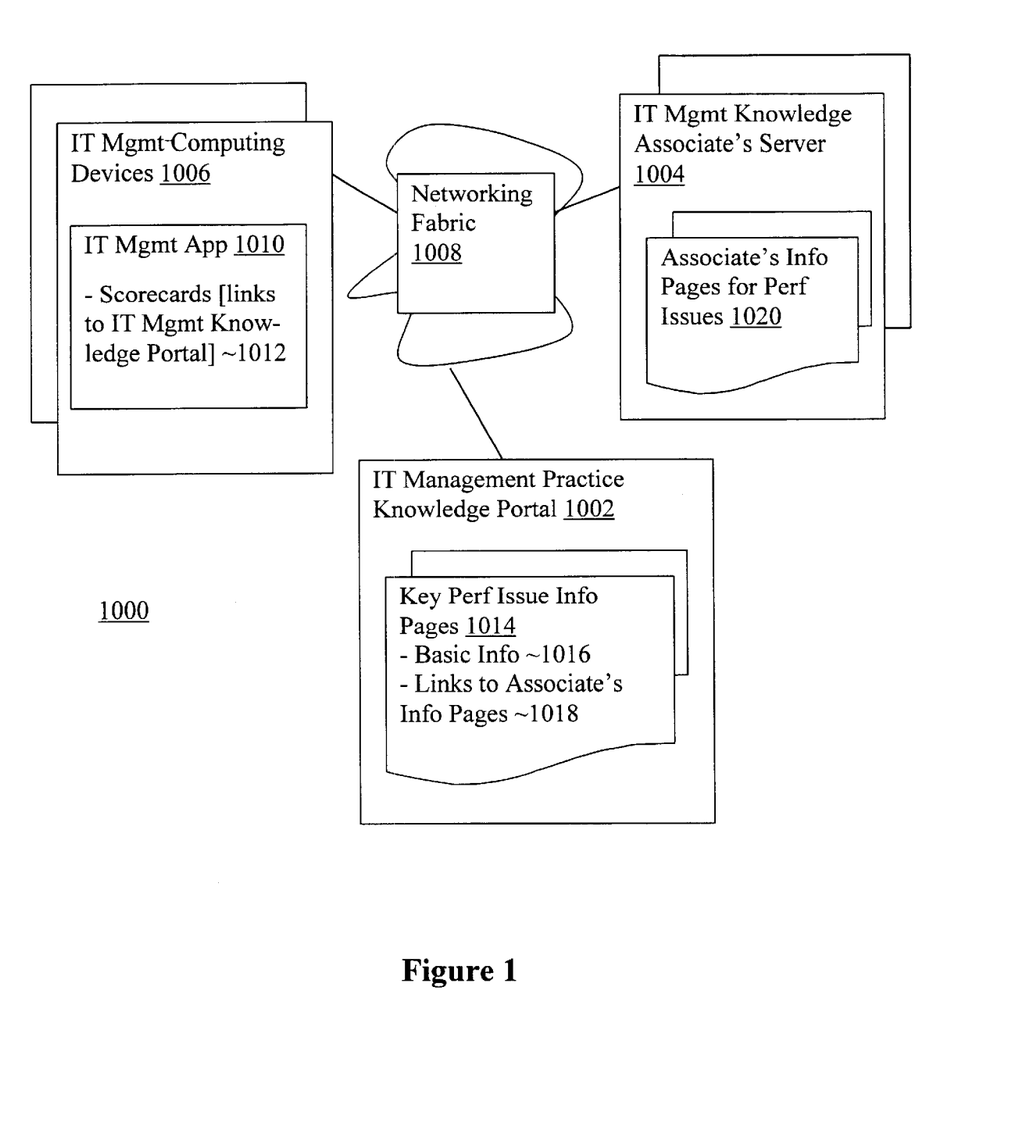
FIG. 1 illustrates an overview of the present invention, in accordance with one embodiment.

Referring now to FIG. 1, wherein an overview of the present invention, in accordance with one embodiment, is shown. As illustrated, the present invention includes IT management practice knowledge portal 1002 and IT management practice knowledge associates 1004 jointly provisioning IT management practice information pages 1014 and 1020 to assist users of IT management application 1010 to determine corrective actions for identified IT portfolio/project problems. As will be described more fully below, IT management practice knowledge portal 1002 provisions "basis" information pages 1014 associated with various IT management practice issues for retrieval. IT management practice knowledge associates 1004, having further contribution in areas of their expertise, provision their corresponding "expert" information pages 1020 associated with IT management practice issues of their expertise, and associate the "expert" information pages 1020 with "basis" information pages 1014 to facilitate their retrieval. Certain management functions or features of IT management application 1010 are associated with "basis" information pages 1014 to make it possible for users of these management features to determine corrective actions to the identified problems using IT management practice information provided by selected ones of "basis" information pages 1014 as well as "expert" information pages 1020.

Those skilled in the art will appreciate that the present invention significantly improves collaboration among experts in provisioning information on key IT management practice issues, and the distribution of these information, making them conveniently available to IT managers and professionals, for use and application to addressing real IT portfolio/project management problems.

As illustrated, knowledge portal 1002, knowledge associates 1004 (also referred to at times as knowledge associates' servers), and IT managers 1006 (or IT managers' computing devices) are coupled to each other via networking fabric 1008. Knowledge portal 1002 includes, in particular, "basis" information pages 1014 for various IT management key performance issues. Each "basis" information page 1014 includes basic information 1016 for one or more key performance issues, and links 1018 to "expert" information pages 1020. Knowledge portal 1002 also includes an interface (not shown) for knowledge associates 1004 to associate their "expert" information pages 1020 for the areas of their expertise with "basis" information pages 1014. Except for the nature of these information pages, and the interface, as well as the manner in which knowledge portal 1002 is used to facilitate collaboration in the provisioning and distribution of IT management practice related information, knowledge portal 1002 may be otherwise constituted, i.e. implemented, as other content and/or e-commerce portals known in the art. Accordingly, except for "basis" information pages 1014, association of "expert" information pages 1020, and delivery of both types of information pages, knowledge portal 1002 will not be otherwise further described.

Each knowledge associate 1004 includes in particular, "expert" information pages 1020 for certain IT management practice issues in the associate's area of expertise, e.g. pre-launch function definition, design techniques, defect removals, and the like. Except for the nature of information pages 1020, and the manner they are delivered in collaboration with knowledge portal 1002 and IT management application 1010, knowledge associates 1004 may otherwise be constituted, i.e. implemented, as other content and/or e-commerce servers known in the art. Accordingly, except for "expert" information pages 1020, association with "basis" information pages 1014, and their delivery, knowledge associates 1004 will not be otherwise further described either.

IT managers 1006 (or their computing devices) include, in particular, IT management application 1010 to facilitate IT managers in tracking and monitoring IT portfolios and projects. IT management application 1010 includes, in particular, management features for IT managers to access and analyze selected key performance indicators or issues. For the illustrated embodiment, these management features include enhanced scorecards 1012 where selected ones of key performance indicators are linked to appropriates "basis" information pages 1014 of IT management knowledge portal 1002, which in turn are linked to selected ones of "expert" information pages 1020, as described earlier. In one embodiment, management features also include "dashboards" and "investment maps" to facilitate IT portfolio and/or project management by IT managers. In these other embodiments, all or selected ones of these other management features, "dashboards", "investment maps" and the like, may also be enhanced to incorporate the teachings of the present invention, as with the earlier described "scorecard" feature. IT management application having management features that include "dashboard", "scorecards" and "investment maps" is the subject of the parent application, which is hereby fully incorporated by reference. Thus, except for a brief description to follow, to facilitate description of the present invention, IT management application 1010 and IT managers (or their computing devices) 1006 will not be otherwise further described.

Networking fabric 1008 is intended to represent a broad range of interconnected private and public networks known in the art, each constituted with networking equipment such as gateways, switches, routers and the like, such as the Internet.

Figure 2:
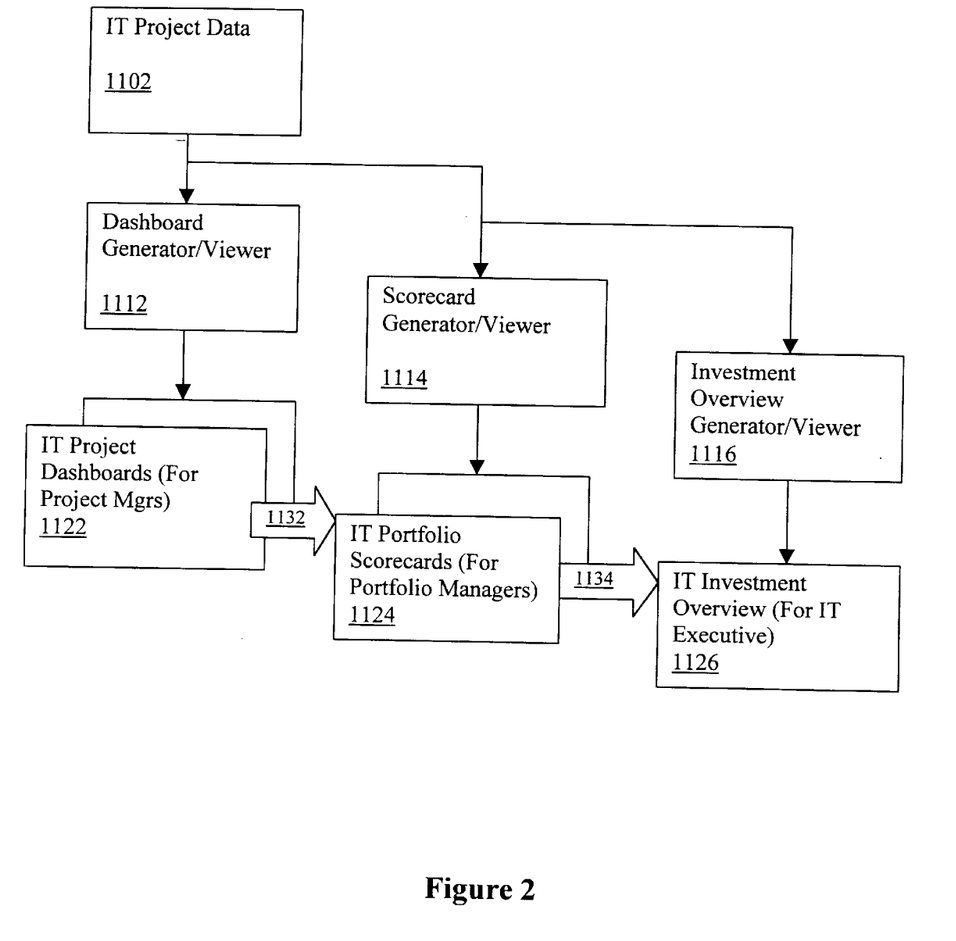
FIG. 2 illustrates an example IT management application of FIG. 1, in accordance with one embodiment.

FIG. 2 illustrates an overview of IT management application of FIG. 1, in accordance with one embodiment. As illustrated, in accordance with the present invention, data associated with IT projects 1102 are collected and stored. More particularly, project data 1102 are associated with a number of performance metrics of IT projects. Also illustrated, for the embodiment, "integrated" dashboard generator/viewer 1112, scorecard generator/viewer 1114 and investment map generator/viewer 1116 are provided to generate IT project dashboards 1122, IT portfolio scorecards 1124 and IT investment maps 1126 respectively. IT project dashboards 1122 are designed to assist IT project managers to manage their respective projects, whereas IT portfolio scorecards 1124 are designed to assist "mid-level" IT portfolio mangers to manage their respective IT portfolios. IT investment maps 1126 in turn are designed to assist an IT executive to manage the entire IT investment of his/her enterprise. More particularly, project dashboards 1122, portfolio scoreboards 1124 and investment maps 1126 are logically integrated (as denoted by arrows 1132 and 1134) to facilitate more in-depth understanding of issues surfaced by investment maps 1126 and by scorecards 1124.

Briefly, project data 1102 are associated with performance metrics designed to show where IT projects stand. In one embodiment, these performance metrics include budget metrics, staffing metrics, project size and quality metrics, and progress metrics. In one embodiment, project data 1102 are stored in tables of a relational database, with each table storing a subset of the data (in columns) for a subset of the projects (in rows). Each dashboard 1122 is designed to assist a project manager in managing a project. In one embodiment, each dashboard 1122 includes a number of graphical depictions for a number of aspects of a project (as indicated by one or more of the earlier described performance metrics). Each scorecard 1124 is designed to assist a portfolio manager in managing the portfolio of IT projects he/she is responsible for. In one embodiment, each scorecard 1124 is a tabular presentation of where the projects of a portfolio stand on various performance indicators, with measurements of the various performance indicators of the projects occupying columns of corresponding rows. Each investment map 1126 is designed to assist an IT executive in managing IT investments of his/her enterprise. In one embodiment, each investment map 1126 graphically depicts the IT portfolios in accordance with risk, technology type, their size and their soundness. Each IT portfolio is graphically represented by a "bubble".

Project data 1102, dashboard generator/viewer 1112, scorecard generator/viewer 1114, investment map generator/viewer 1116, IT project dashboards 1122, IT portfolio scorecards 1124 and IT investment maps 1126 are all described in detail in the incorporated by reference parent application. Except for scorecards 1124, these other elements will not be further described.

Figure 3:
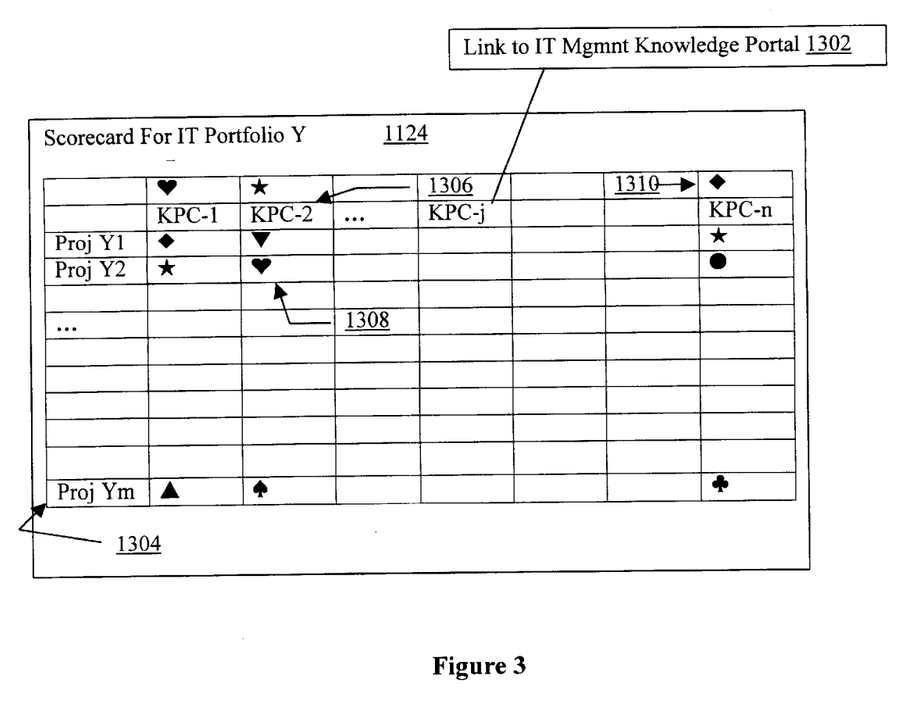
FIG. 3 illustrates an example management function of the management application of FIG. 2 (scorecard) incorporated with the teachings of the present invention, in accordance with one embodiment.

FIG. 3 illustrates a scorecard in further detail in accordance with one embodiment. For the illustrated embodiment, each performance indicator may correspond to a performance metric or may be an aggregate, weighted or otherwise, of a number of performance metrics. Additionally, the measurements are advantageously depicted in symbols 1308 (in color or otherwise) to enable the current standing of a performance indicator of a project to be easily highlighted for a portfolio manager. For selected ones of the performance indicators, corresponding cross project composite measures are automatically computed and presented in columns of a cross project row (the top row, for the illustrated embodiment). Likewise, the cross project composite measures may be "aggregated" in a weighted or non-weighted manner, as well as presented in symbolic fashion (color or otherwise). Most importantly, in accordance with the present invention, for selected ones of the performance indicators, links 1302 are provided linking the performance indicators to "basis" information pages 1014 of knowledge portal 1002 (and indirectly to "expert" information pages 1020 of knowledge associates 1004, to enable users of dashboards 1122, scorecards 1124 and investment maps 1126 to be able to use the IT management practice information provided by information pages 1014 and 1020 to determine corrective actions for identified problems.

In a preferred one of the embodiments, a portfolio manager may select the portfolios or projects of a portfolio and the performance indicators of the projects to be included, the manner the performance indicators are to be "aggregated", whether any cross project composite measures are to be computed, the manner in which the cross project composite measures are to be computed, as well as the manner in which the measurements are to be presented. These selections may too be specified by the portfolio manager through anyone of a number of "selection dialogues" known in the art.

Before proceeding to further describe the present invention, again it should be noted that while only enhanced scorecards were illustrated in FIG. 3, the present invention may also be practiced with other management functions/features of an IT management application, including, but not limited to the earlier mentioned "dashboards", "investment maps" and the like.

Figure 4:
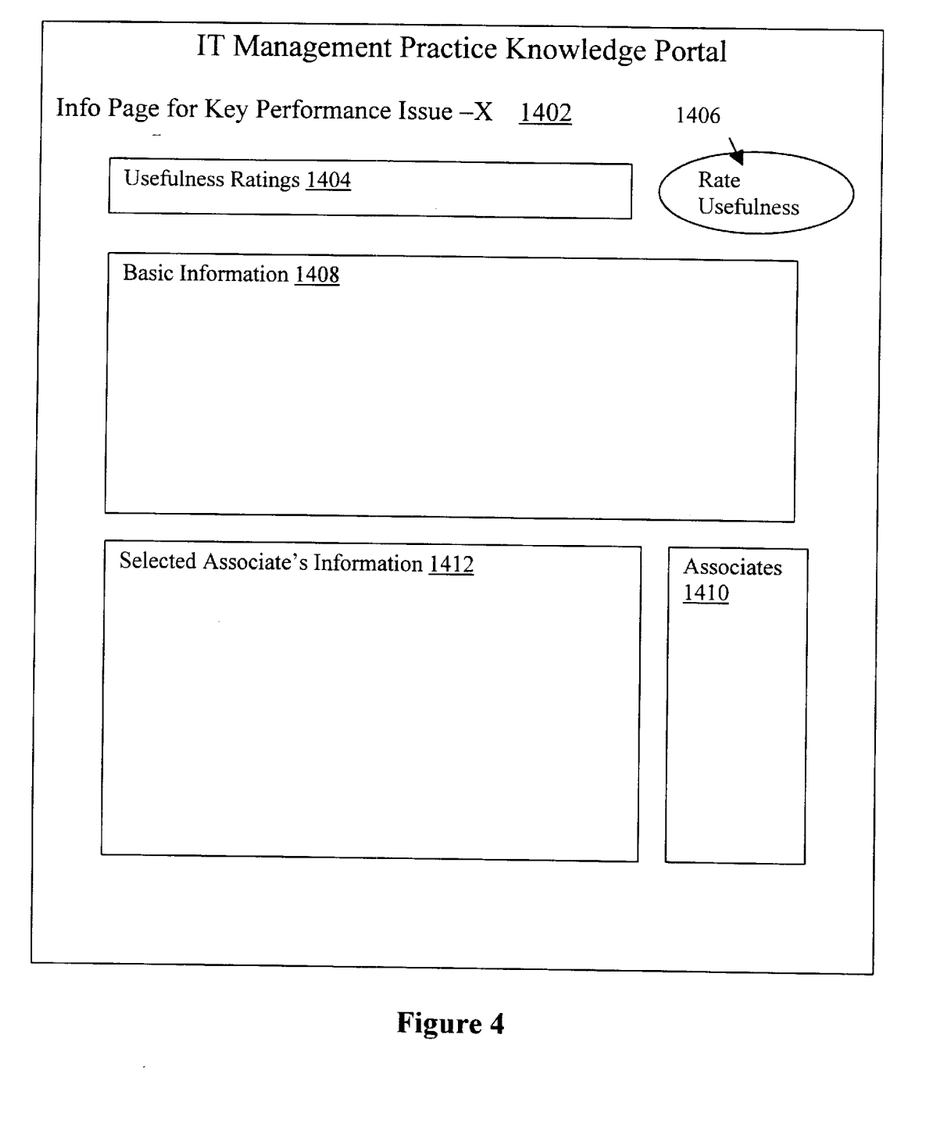
FIG. 4 illustrates an example IT management practice information page of IT management practice knowledge portal of FIG. 1, in accordance with one embodiment.

FIG. 4 illustrates an example "basis" information page for a key performance indicator/issue, in accordance with one embodiment. As illustrated, for the embodiment, information page for key performance indicator/issue X 1402 includes basic information 1408 on the key performance indicator/issue X, and a list of "expert" associates 1410 for selection by a user of information page 1402. Further, information page 1402 includes the "expert" information page 1412 for the selected "expert" associate. For the embodiment, information page 1402 further includes usefulness rating mechanism 1406 for a user of information page 1402 to rate the information page in terms of its usefulness, as well as the aggregate usefulness ratings 1404 given by past users of information page 1402. In alternate embodiment, more or less information may be included with information page 1402, e.g. other forms of interactive ratings, feedback, discussion and/or collaboration mechanisms.

Figure 5:
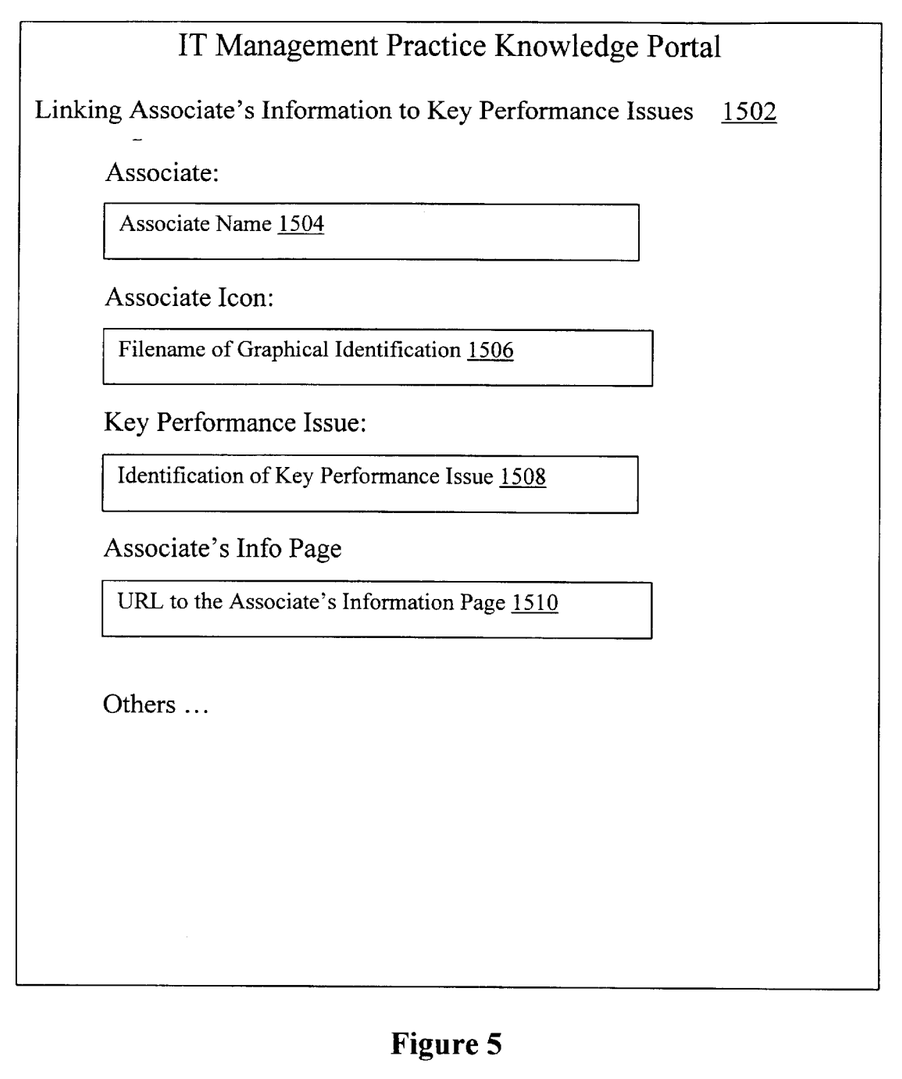
FIG. 5 illustrates an interface of IT management practice knowledge portal for an IT management practice knowledge associate to associate its information pages with those of IT management practice knowledge portal, in accordance with one embodiment.

FIG. 5 illustrates an example interface suitable for use by an "expert" associate to associate an "expert" information page for a key performance indicator/issue with the indicator/issue's "basis" information page. As illustrated, for the embodiment, interface 1502 includes an area 1504 for an "expert" associate to enter its name and an area 1506 for the "expert" associate to identify the filename containing its icon to be displayed for selection on the corresponding "basis" information page. Further, interface 1502 includes area 1508 for the "expert" associate to enter an identification of a key performance indicator/issue, the "expert" information page is to be associated with, and area 1510 to enter a uniform resource locator (URL) identifying where the "expert" associate's "expert" information page is to be located. Each of the linked "expert" information page may also contain additional links to additional "expert" information pages of the same or other experts. In alternate embodiments, other fields and/or features may also be included.

Figure 6:
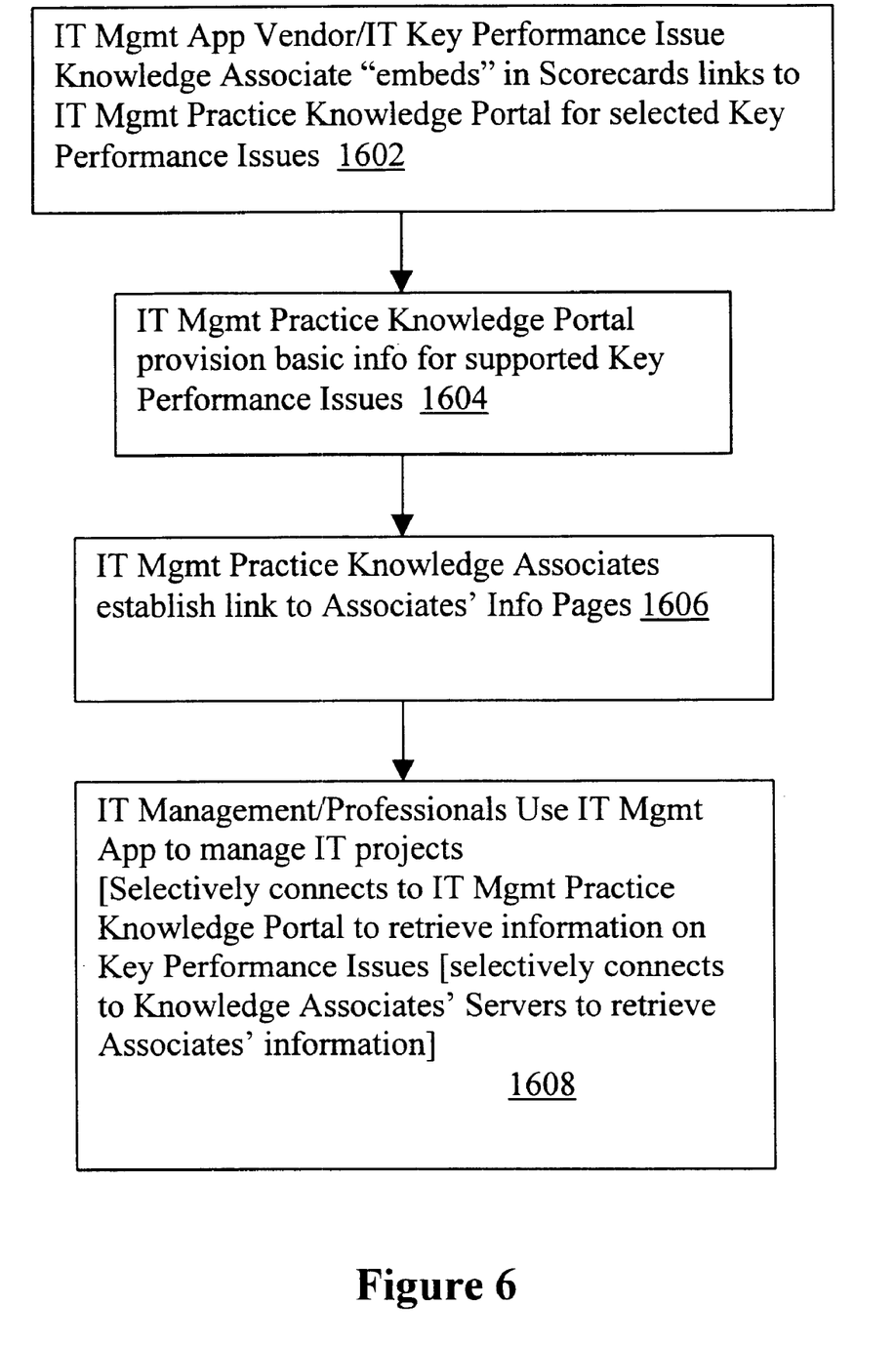
FIG. 6 illustrates a method of the present invention, in accordance with one embodiment.

FIG. 6 illustrates a method of the present invention, in accordance with one embodiment. As illustrated, at 1602, IT management application vendor and/or IT key performance indicator/issue "expert" associate "embeds" the earlier described links to "basis" information pages into selected scorecards for selected key performance indicators/issues of the scorecards. In one embodiment, IT management application vendor provides an application programming interface (API) to enable "expert" associates to be able to independently provision the links. At 1604, IT management practice knowledge portal provisions the earlier described "basis" information pages for key performance indicators/issues of interest. At 1606, IT management practice "expert" associates provision the "expert" information pages, and establish association with the "basis" information pages. At 1608, IT management/professionals use IT management application to manage IT portfolios/projects, selectively connecting to knowledge portal, and optionally, to selected ones of the "expert" associate servers to retrieve IT management practice information. Accordingly, basic as well as expert IT management practice information may be selectively and conveniently retrieved to assist the IT management/professionals in determining corrective actions for identified problems. The selection and delivery may be effectuated via the example mechanisms earlier described or other technologies and processes of like kind.

Figure 7:
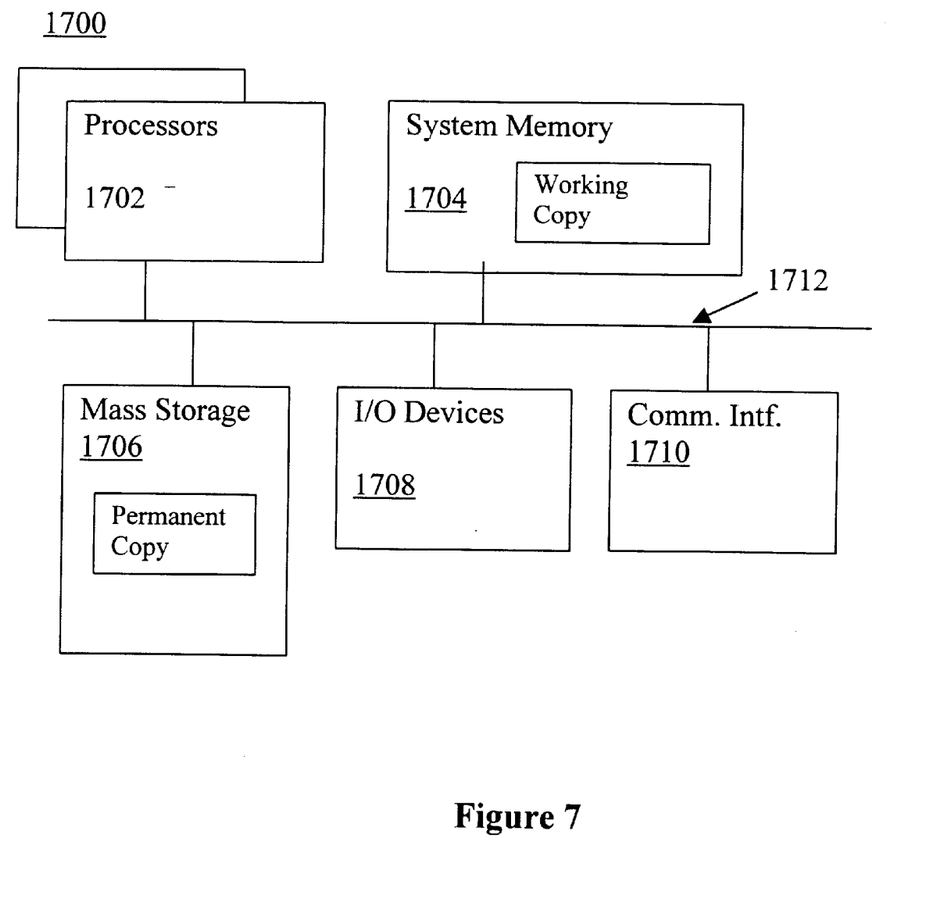
FIG. 7 illustrates a computer system suitable for use as an IT management's computing device or a server of IT management practice knowledge portal/associate server, in accordance with one embodiment.

FIG. 7 illustrates a computer system suitable for use to implement portal 1002, associate servers 1004 or computing devices 1006 of FIG. 1 in accordance with one embodiment. As shown, computer system 1700 includes one or more processors 1702 (typically depending on whether it is used to implement portal 1002, associate server 1004, or one of computing devices 1006) and system memory 1704. Additionally, computer system 1700 includes mass storage devices 1706 (such as diskette, hard drive, CDROM, and so forth), input/output devices 1708 (such as keyboard, cursor control, and so forth) and communication interfaces 1710 (such as network interface cards, modems, and so forth). The elements are coupled to each other via system bus 1712, which represents one or more buses. In the case of multiple buses, they are bridged by one or more bus bridges (not shown). Each of these elements performs its conventional functions known in the art. In particular, system memory 1704 and mass storage 1706 are employed to store a working copy and a permanent copy of the programming instructions implementing the teachings of the present invention. The permanent copy of the programming instructions may be loaded into mass storage 1706 in the factory, or in the field, as described earlier, through a distribution medium (not shown) or through communication interface 1710 (from a distribution server (not shown). The constitution of these elements 1702–1712 are known, and accordingly will not be further described.

Thus, a novel method and apparatus for distributing IT management practice information has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method for distributing management practice information to a computer application for managing an endeavor, the method comprising the steps of:

provisioning a knowledge portal including a first information page conveying initial management practice information related to an endeavor;

aligning a knowledge associate offering a second information page conveying specialized management practice information associated with the initial management practice information presented by the first information page;

including within the first information page an indication of the knowledge associate offering the second information page;

linking the second information page to the indication of the knowledge associate on the first information page;

linking the first information page to a management feature of a computer application for managing the endeavor;

facilitating management of the endeavor by presenting to the computer application the initial management practice information of the first page upon a selection of the linked management feature, and the specialized management practice information of the second page upon a selection of the linked indication of the knowledge associate within the presented first page.

2. The method of claim 1 wherein:

the endeavor is managed in terms of one or more key performance issues;

the presented initial management practice information and specialized management practice information enable an assessment of the endeavor according to the one or more key performance issues.

3. The method of claim 1 wherein the endeavor is an information technology endeavor.

\* \* \* \* \*

UNITED STATES PATENT AND TRADEMARK OFFICE
CERTIFICATE OF CORRECTION

PATENT NO. : 6,917,921 B1
DATED : July 12, 2005
INVENTOR(S) : Cimral et al.

It is certified that error appears in the above-identified patent and that said Letters Patent is hereby corrected as shown below:

Column 1,
Line 38, change "on demaned" to -- on demand --.

Column 3,
Line 15, change "these information" to -- this information --.
Line 35, change "practice related" to -- practice-related --.
Line 65, change "appropriates" to -- appropriate --.

Column 4,
Lines 9, 21 and 22, after "application" insert -- 1010 --.

Column 5,
Lines 37 and 38, change "cross project" to -- cross-project --.
Line 64, change "embodiment" to -- embodiments --.

Column 6,
Lines 30 and 37, after "portal" insert -- 1002 --.
Line 36, after "application" insert -- 1010 --.

Signed and Sealed this

Twenty-seventh Day of December, 2005

JON W. DUDAS
*Director of the United States Patent and Trademark Office*